March 13, 1956   A. H. MAGNESS   2,737,922
COMFORT STALL STRUCTURE FOR COWS
Filed July 21, 1954
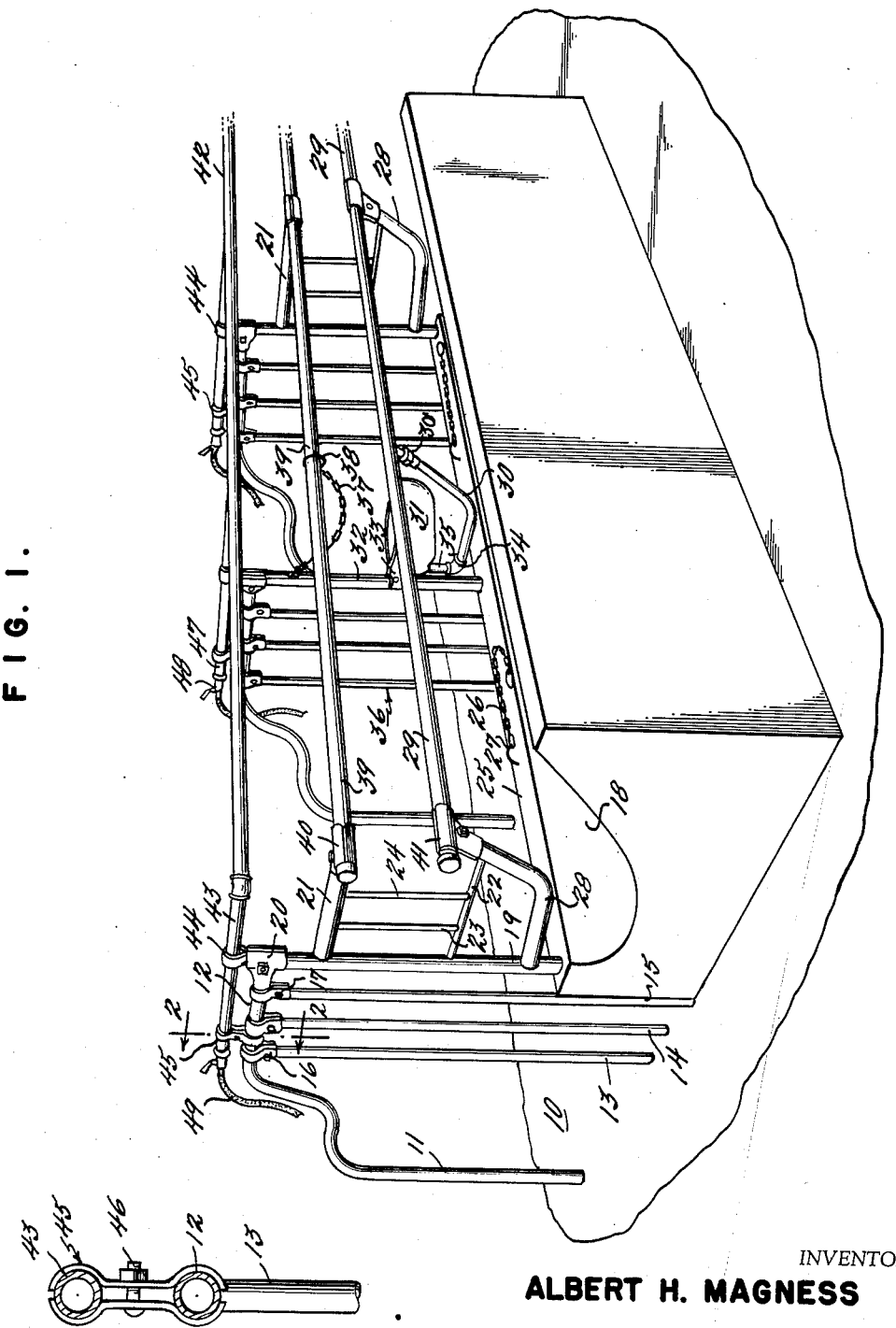
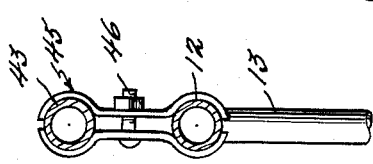
INVENTOR
ALBERT H. MAGNESS
BY
*Semmes & Semmes*
ATTORNEYS United States Patent Office 2,737,922
Patented Mar. 13, 1956

2,737,922

COMFORT STALL STRUCTURE FOR COWS

Albert H. Magness, Bel Air, Md.

Application July 21, 1954, Serial No. 444,720

3 Claims. (Cl. 119—14.03)

The present invention relates broadly to stalls for cows and more specifically to a new construction of a comfort stall.

In stalls of the type related to the present invention, vacuum lines are required which serve to operate milking machines. In known constructions a pipe forming a portion of a front barrier for cows standing in the stall has been utilized additionally to serve as the vacuum line. In previous stalls, however, the vacuum line was made rigid with the remainder of the stall structure and this required an operator doing the milking to walk between a cow and a stall partition to the front part of the stall to attach the vacuum line to the milking machine. This resulted in disadvantages and additionally danger to an operator. In this type of stall it was possible for a cow to hit an operator with her horn. In rainy weather the operator would get wet when rubbing against wet cows. Additionally, the milk cock, where the vacuum line attached, was in front of the cow and it was found that the cows could easily nose open these milk cocks which would in turn release the pressure from the vacuum line. Such a rigid vacuum line would not permit any alignment of cows and, as an example, when replacing short cows in stalls that there were intended for long cows there would be no alignment whatsoever. This resulted in manifest difficulties and disadvantages.

An object of the present invention accordingly is to provide a stall of this general character in which all of the aforementioned disadvantages and drawbacks have been overcome, while at the same time providing outstanding and additional advantages in manufacturing, installation and use.

Another object of the present invention is to provide a comfort stall wherein a plurality of pipes are utilized to form a front barrier and which are placed in vertically spaced relationship with one another. The uppermost one of these pipes is movably mounted with respect to the remainder of the stall structure and this movable pipe constitutes a vacuum line in addition to serving as a portion of the barrier.

An additional object of the present invention is to provide a stall construction wherein a milk cock connected into the vacuum line is extended back over a stall partition where it is readily available to an operator doing the milking to make connections to the milking machines. This additionally results in a much shorter tube between the vacuum line and the milking machine which eliminates excessive cleaning and chances for bacteria to collect.

A still further object of the present invention is to provide a stall structure in which a minimum number and size of clamps are utilized to assemble the stall, thereby eliminating inventory problems and permitting a considerable reduction in installation cost since an installer does not need to figure out where different types and sizes of clamps are to be used.

Another object of the present invention is to provide an adjustable vacuum line as a part of the actual stall structure and which is adapted for quick and easy adjustment to different size cows in stalls for increased efficiency in use of the stalls.

Further and additional objects and advantages of the present invention will be apparent from the following detailed description of an embodiment of the present invention when taken together with the accompanying drawings in which:

Fig. 1 is a perspective view of the stall construction of the present invention; and Fig. 2 is an enlarged sectional view taken on the line 2—2 of Fig. 1.

The stall structure, as shown in the drawing, consists of a floor 10 which is formed of concrete in which are embedded a plurality of vertical pipes which form side barriers and partitions and which also serve to support horizontally extending pipes which form or constitute the front barrier of the stalls. The side partition of the stalls is formed from a pipe 11 having its lower end embedded in the concrete and its upper end bent in a generally curved manner to eliminate sharp corners and a substantially horizontal portion 12. A plurality of filler pickets such as shown at 13, 14 and 15 have their lower ends embedded in the concrete floor 10 and their upper ends are fastened to the horizontal portion 12 of pipe 11 by means of T-clamps 16 with the usual bolt 17 for tightening purposes.

A feeding trough 18 which can be formed in any desired manner and of any desired material is placed on the floor 10 in proximity to the front of the stall. This feed trough, as shown in Fig. 1, serves as a support for an upright post 19 constituting the forwardmost post of the partition. The free end of the horizontal portion 12 of pipe 11 is connected to the post 19 by means of a T-clamp 20. It will be noted that the T-clamp 20 is of a larger size than the T-clamps 16. These are the only two sizes of clamps of this type utilized in the stall of the present invention. The post 19 in the present stall constitutes a curb post in conjunction with the remainder of the construction of the sides of the stall.

A horizontal bar or pipe 21, and a lower bar or pipe 22, are secured into the pipe 19 and extend forwardly and horizontally therefrom. Interconnecting the pipes 21 and 22 are upright rods 23 and 24 which serve in the nature of filler pickets for a side partition or barrier between the individual stalls which are constructed in rows, or to form the ends of an end stall as shown for example in Fig. 1.

The front barrier of the stall includes a curb 25 to which is attached a tie chain 26 by means of a U-anchor 27 embedded in the material of the curb. A lower upwardly bent arm 28 is also secured to post 19 in proximity to the top of curb 25. The pipe 22 at its outer end is interconnected with this lower arm 28 for bracing and giving rigidity to the structure. As can be seen in Fig. 1 of the drawings, for each two stalls the arm 28 and additionally the partition members 21, 22, 23 and 24 are utilized. This, however, is a matter of choice only and can be varied as desired by the user or manufacturer.

The arms 28 at their upper free ends support a pipe 29 which constitutes a water line. In between the two stalls a union 30' is used to interconnect the water line 29 and a water pipe 30. A watering pan 31 is secured on post 32 by means of a bracket 33. The water pipe 30, by means of L 34 and reducer 35, leads water from the water line 29 to the watering pan 31. The watering pan 31 serves for watering of cows in two contiguous stalls divided by the partition generally designated 36. A chain divider 37 is attached to partition post 32 and at its opposite end has a ring 38 passing around a dummy pipe 39 secured at the outer ends of arms 21 by means of T-clamps 40. The water line 29 is also secured to the pipes 28 by means of T-clamps 41. The pipes 29 and 39 forming the lower portion of the front wall or front curb structure of the stalls are stationary with respect to the remainder of the structure of the stalls.

As hereinbefore pointed out stalls for cows also require vacuum lines and connecting means therefrom leading to milking machines. In Fig. 1 such a vacuum line is shown at 42 which is positioned above the pipes 29 and 39 and also plays a roll in forming the curb or front section of the stall structure. The vacuum line 42 has connected thereinto at each stall a lead-in vacuum line section 43 which extends rearwardly over the side partitions of the individual stalls. The pipes 43 are slidably supported by means of brackets 44 mounted on posts 19 and supported at their rearward area or position by means of double yoke clamps 45, the other end of which is connected with the pipes 12. A bolt and nut arrangement 46 is used in the clamps for tightening. The clamp 45, by means of adjusting the bolt and nut 46, permits the entire vacuum line 42, and accordingly the lead-in vacuum lines 43, to be adjusted relatively to the front or curb assembly of the stall.

The open ends of lead-in vacuum pipes 43 are provided with reducers 47 and milk cocks 48. The milk cocks 48 are adapted to be connected with rubber hoses 49 leading to milking machines.

By releasing the vacuum line clamps 45 at the stall partitions, the entire vacuum line can be moved either forward or backward whichever is necessary to take care of aligning different size cows. This has not heretofore been possible and as hereinbefore pointed out a rigid vacuum line had many inherent disadvantages and has not been found to be entirely satisfactory. Due to the precent construction, however, these disadvantages have been overcome. The present construction additionally extends the vacuum line so that the milk cock is positioned back over the stall partition where it is handy for an operator doing the milking to make connections. Due to this location of the milk cock toward the rear of the partitions, a very much shorter tube can be used interconnecting the milk cocks 48 and milking machines so that excessive cleaning is eliminated and chances for bacteria to collect are minimized.

Both from the standpoint of the manufacturer and the purchaser or user a saving in cost and labor for erecting the stalls is effected by utilizing only two different sizes of T-clamps as hereinbefore pointed out. The construction and operation of the present invention will be readily apparent from the foregoing description when taken together with the drawings, and the advantages will likewise be readily apparent to those in the art. Manifestly minor changes in details of construction can be effected without departing from the spirit and scope of the present invention as defined in the appended claims.

I claim:

1. In a comfort stall structure for cows having a front barrier and side partitions, a vacuum line pipe including a front section mounted above the front barrier in alignment therewith and forming an increment thereof and a lead-in section extending along a side partition to the rear of the stall, an adjustable double yoke clamp interconnecting said lead-in section and the side partition in adjustably and slidably mount said pipe whereby rearward or forward movement thereof is permitted for cow alignment in the stall.

2. In a comfort stall structure as claimed in claim 1, the rearward end of said lead-in section having a reducer and milk cock connected thereto and adapted for connection to a milking machine tube.

3. In a comfort stall structure as claimed in claim 1, and wherein a plurality of stalls are arranged in a longitudinal line and separated by side partitions, said vacuum line pipe comprising a front section aligned with and extending along the front barriers of said stalls and lead-in sections extending along each side partition to the rear of the stalls, said lead-in sections being adjustably connected to the side partitions and adjustably mounting the vacuum line pipe whereby it can be moved as a unit for cow alignment in the plurality of stalls.

References Cited in the file of this patent
UNITED STATES PATENTS

| | | |
|---|---|---|
| 1,210,468 | Harner | Jan. 2, 1917 |
| 1,839,313 | Hibbs et al. | Jan. 5, 1932 |

FOREIGN PATENTS

| | | |
|---|---|---|
| 314,461 | Great Britain | June 28, 1929 |